United States Patent
Sunaga

(10) Patent No.: US 10,893,214 B2
(45) Date of Patent: Jan. 12, 2021

(54) CAMERA MONITORING SYSTEM, IMAGE PROCESSING DEVICE, VEHICLE AND IMAGE PROCESSING METHOD

(71) Applicant: KYOCERA Corporation, Kyoto (JP)

(72) Inventor: Toshihiro Sunaga, Machida (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/464,776

(22) PCT Filed: Nov. 16, 2017

(86) PCT No.: PCT/JP2017/041284
§ 371 (c)(1),
(2) Date: May 29, 2019

(87) PCT Pub. No.: WO2018/101063
PCT Pub. Date: Jun. 7, 2018

(65) Prior Publication Data
US 2019/0394410 A1    Dec. 26, 2019

(30) Foreign Application Priority Data

Nov. 30, 2016 (JP) ................. 2016-233490

(51) Int. Cl.
*H04N 7/18* (2006.01)
*H04N 5/262* (2006.01)
(Continued)

(52) U.S. Cl.
CPC ............ *H04N 5/2624* (2013.01); *B60R 1/00* (2013.01); *B60R 11/04* (2013.01);
(Continued)

(58) Field of Classification Search
CPC .. H04N 5/2624; H04N 5/23299; H04N 7/181; H04N 5/232; H04N 7/18;
(Continued)

(56) References Cited

U.S. PATENT DOCUMENTS 6,559,761 B1 * 5/2003 Miller ................ B60R 1/00
340/435
9,106,842 B2 * 8/2015 Sumi ................ H04N 5/23238
(Continued)

FOREIGN PATENT DOCUMENTS

EP   1077161 A2   2/2001
JP   H10-257482 A   9/1998
(Continued)

*Primary Examiner* — Howard D Brown, Jr.
(74) *Attorney, Agent, or Firm* — Studebaker & Brackett PC

(57) ABSTRACT

A camera monitoring system includes a first camera configured to capture an image of an area including a predetermined area on the left side of a vehicle, a second camera configured to capture an image of an area including a predetermined area on the right side of the vehicle and a third camera configured to capture an image of an area
(Continued)

including a predetermined area behind the vehicle. The camera monitoring system further includes a monitor configured to display a composite image including a first captured image captured by the first camera, a second captured image captured by the second camera and a third captured image captured by the third camera and an image processor configured to control a layout of the composite image, and change the layout according to at least either the moving body information or the environmental information.

17 Claims, 16 Drawing Sheets

(51) Int. Cl.
    *H04N 5/232* (2006.01)
    *B60R 1/00* (2006.01)
    *B60R 11/04* (2006.01)
    *B60R 11/00* (2006.01)

(52) U.S. Cl.
    CPC ......... *H04N 5/23299* (2018.08); *H04N 7/181* (2013.01); *B60R 2011/0085* (2013.01); *B60R 2300/105* (2013.01); *B60R 2300/303* (2013.01)

(58) Field of Classification Search
    CPC ... B60R 1/00; B60R 11/04; B60R 2011/0085; B60R 2300/105; B60R 2300/303; B60R 11/02
    See application file for complete search history.

(56) References Cited

U.S. PATENT DOCUMENTS

| | | | |
|---|---|---|---|
| 2004/0085447 A1* | 5/2004 | Katta | H04N 7/181 348/143 |
| 2004/0207515 A1* | 10/2004 | Chung | B60Q 9/008 340/435 |
| 2009/0097708 A1* | 4/2009 | Mizuta | B60R 11/04 382/103 |
| 2009/0128630 A1* | 5/2009 | Kanaoka | H04N 5/23238 348/148 |
| 2011/0043600 A1* | 2/2011 | Gopal | H04L 65/403 348/14.09 |
| 2016/0288717 A1* | 10/2016 | Kameshima | B60R 1/04 |
| 2016/0364842 A1* | 12/2016 | Kiyo | H04N 5/247 |
| 2017/0094227 A1* | 3/2017 | Williams | H04N 7/181 |

FOREIGN PATENT DOCUMENTS

| | | |
|---|---|---|
| JP | 2006-264574 A | 10/2006 |
| WO | 2007/032427 A1 | 3/2007 |

* cited by examiner

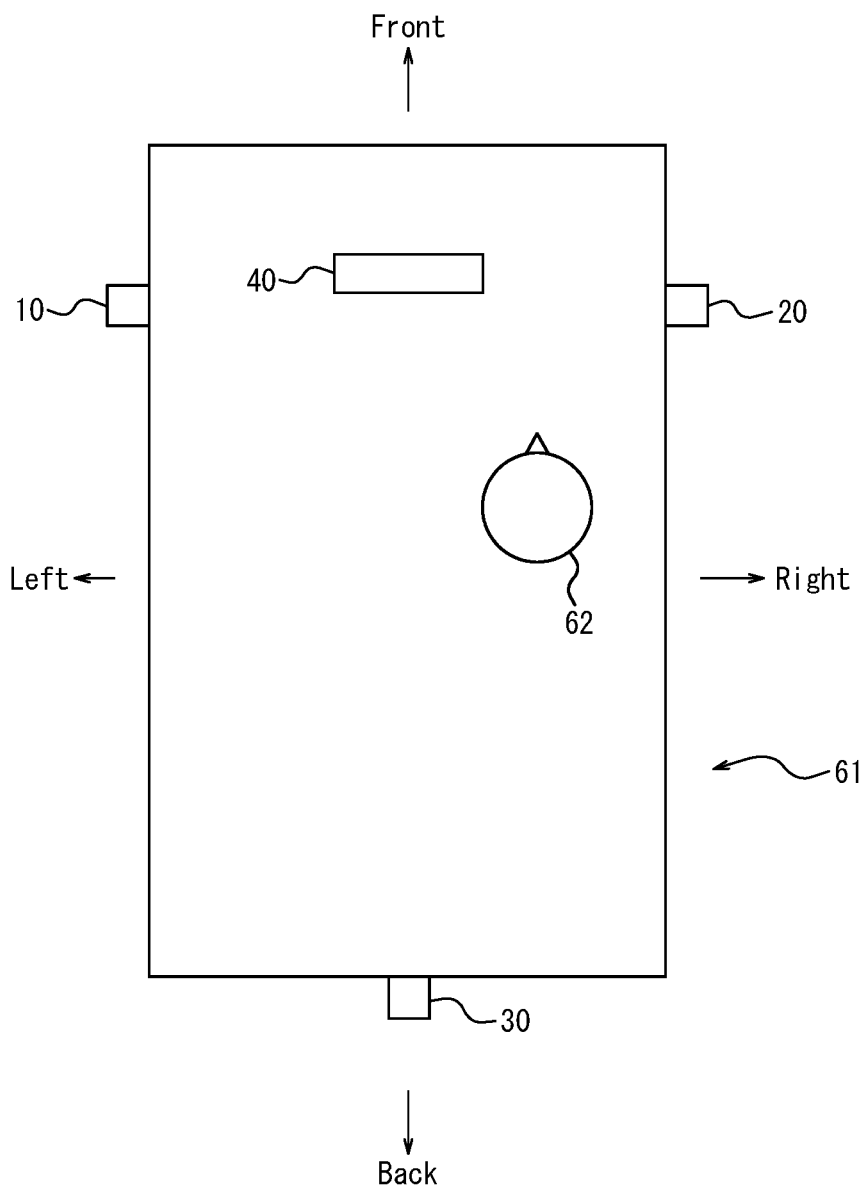

Side view in the first mode

Top view in the first mode

Side view in the second mode

Top view in the second mode

A first image sensor arranged horizontally long

Captured range

A first image sensor arranged vertically long

Captured range

Side view in the first mode

Top view in the first mode

Side view in the second mode

Top view in the second mode

Side view in the first mode

Top view in the first mode

Side view in the second mode

Top view in the second mode

CAMERA MONITORING SYSTEM, IMAGE PROCESSING DEVICE, VEHICLE AND IMAGE PROCESSING METHOD

CROSS-REFERENCE TO RELATED APPLICATION

This application claims priority to and the benefit of Japanese Patent Application No. 2016-233490 (filed on Nov. 30, 2016), the entire contents of which are incorporated herein by reference.

TECHNICAL FIELD

This disclosure relates to a camera monitoring system, an image processing device, a vehicle and an image processing method.

BACKGROUND

A camera monitoring system that captures an image of outside area of a moving body such as a vehicle and allows a monitor to display a captured image has been known. Unlike a conventional optical mirror, the camera monitoring system indirectly observes around a vehicle.

For example, Patent Literature 1 (PTL 1) discloses a camera monitoring system that changes an angle of view of a vehicle-mounted camera according to a vehicle's running speed. In the camera monitoring system according to PTL 1, an angle of view of a vehicle-mounted camera is decreased when a vehicle's running speed is low, and an angle of view of the vehicle-mounted camera is increased when the running speed is high. In this manner, characteristics of driver's field of view, that is, a decrease in the field of view during running at high speed can be complemented.

For example, Patent Literature 2 (PTL 2) discloses a camera monitoring system that determines if any change occurs in a traveling direction of a vehicle and changes the capturing direction according to the change in the traveling direction of the vehicle. With this camera monitoring system, appropriate information can be obtained even in the case of a curved path.

There is an increased demand for technology for indicating a captured image of outside a moving body.

CITATION LIST

Patent Literature

PTL 1: JP2006-264574 (A)
PTL 2: WO2007/032427 (A1)

SUMMARY

A camera monitoring system according to an embodiment of this disclosure has a first camera configured to capture an image of an area including a predetermined area on the left side of a vehicle, a second camera configured to capture an image of an area including a predetermined area on the right side of the vehicle, and a third camera configured to capture an image of an area including a predetermined area behind the vehicle. The camera system further has a monitor configured to display a composite image including a first captured image captured by the first camera, a second captured image captured by the second camera and a third captured image captured by the third camera, and an image processor configured to control a layout of the composite image and change the layout according to at least either the moving body information or the environmental information.

An image processing device according to an embodiment of this disclosure has a communication module configured to receive a first captured image captured by a first camera configured to capture an image of an area including a predetermined area on the left side of a vehicle, a second captured image captured by a second camera configured to capture an image of an area including a predetermined area on the right side of the vehicle, and a third captured image captured by a third camera configured to capture an image of an area including a predetermined area behind the vehicle. The image processing device further has an image processor configured to control a layout of a composite image including the first captured image, the second captured image and the third captured image displayed on a monitor, and to change the layout according to at least either the moving body information or the environmental information.

A vehicle according to an embodiment of this disclosure has a camera monitoring system. The camera monitoring system includes a first camera configured to capture an image of an area including a predetermined area on the left side of a vehicle, a second camera configured to capture an image of an area including a predetermined area on the right side of the vehicle and a third camera configured to capture an image of an area including a predetermined area behind the vehicle. The camera monitoring system further has a monitor configured to display a composite image including a first captured image captured by the first camera, a second captured image captured by the second camera and a third captured image captured by the third camera and an image processor configured to control a layout of the composite image and to change the layout according to at least either the moving body information or the environmental information.

An image processing method according to an embodiment of this disclosure is an image processing method of a camera monitoring system that has a first camera, a second camera, a third camera, a monitor and an image processor. The image processing method includes: capturing, by the first camera, an image of an area including a predetermined area on the left side of a vehicle; capturing, by the second camera, an image of an area including a predetermined area on the right side of the vehicle; and capturing, by the third camera, an image of an area including a predetermined area behind the vehicle. The image processing method further includes the steps of: controlling, by the image processor, a layout of a composite image displayed on the monitor according to at least either the moving body information or the environmental information; and displaying the composite image by the monitor. The composite image includes a first captured image captured by the first camera, a second captured image captured by the second camera and a third captured image captured by the third camera.

BRIEF DESCRIPTION OF THE DRAWINGS

In the accompanying drawings:

FIG. 3 is a diagram illustrating a vehicle provided with a camera monitoring system viewed from the top;

DETAILED DESCRIPTION

An embodiment of this disclosure will be described below with reference to drawings.

(Camera Monitoring System)

A camera monitoring system 1 according to an embodiment of this disclosure will be described with reference to FIG. 1.

Figure 1:
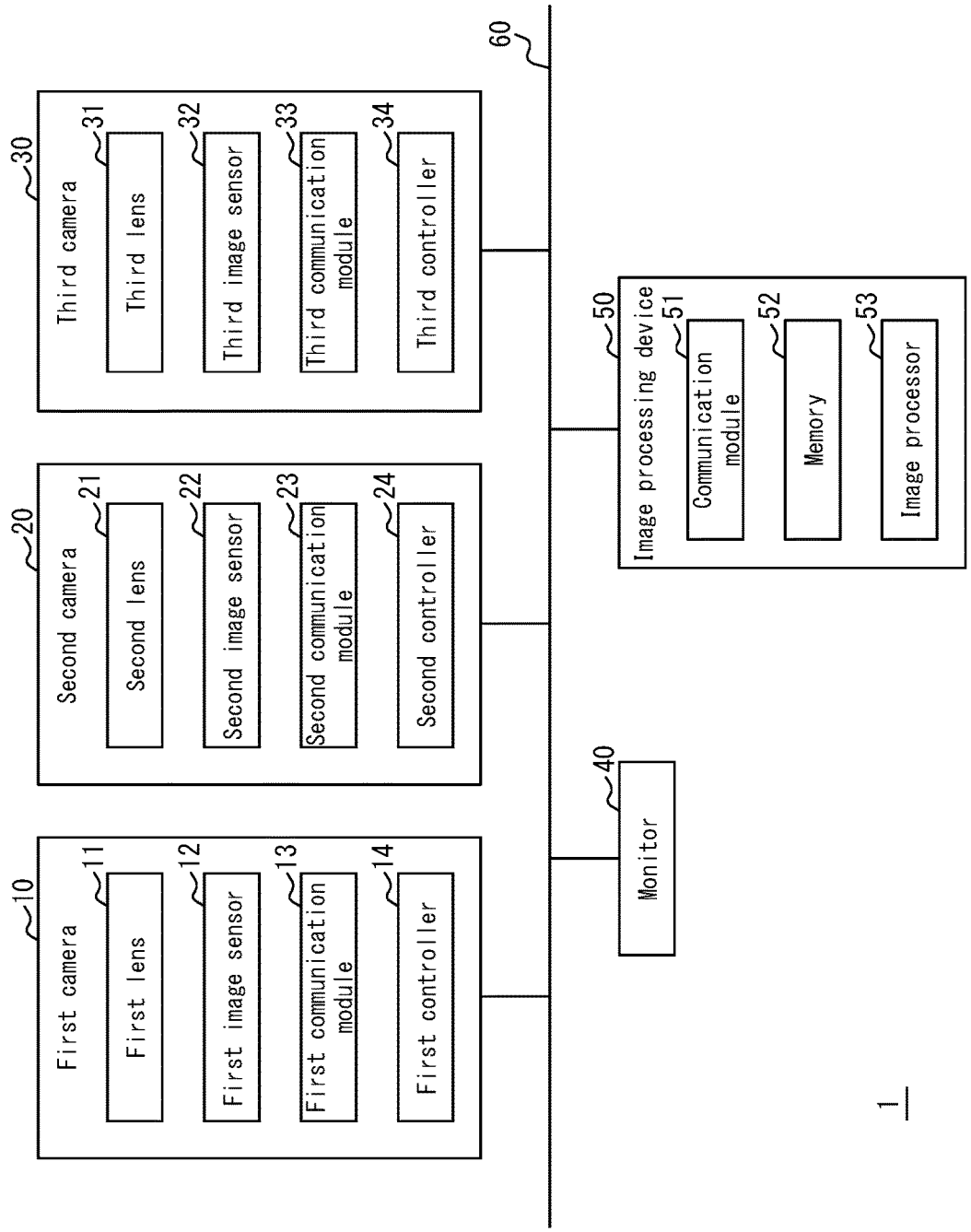
FIG. 1 is a block diagram illustrating a schematic configuration of a camera monitoring system according to an embodiment of this disclosure.

As illustrated in FIG. 1, the camera monitoring system 1 has a first camera 10, a second camera 20, a third camera 30, a monitor 40 and an image processing device 50. Each component of the camera monitoring system 1 can transmit/receive information over a network 60, for example. The network 60 may include at least either wireless network or wired network, for example. The wired network may include Controller Area Network (CAN) and the like.

In another embodiment, a part or all of the components of the camera monitoring system 1 may be integrally formed as one apparatus. For example, the first camera 10, the second camera 20, the third camera 30 or the monitor 40 may have a built-in image processing device 50.

Figure 2:
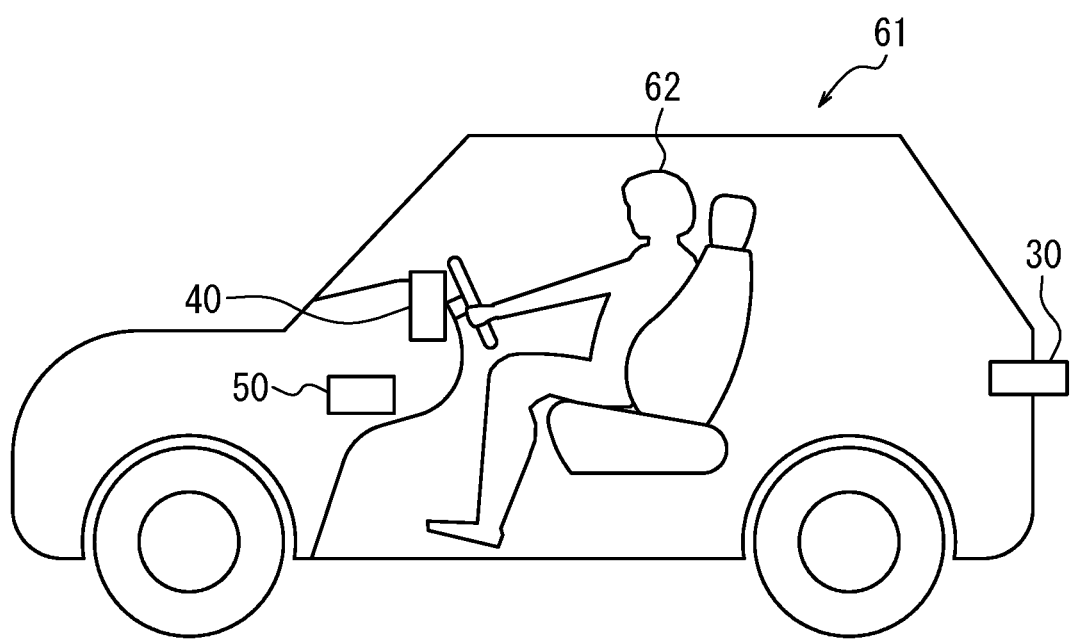
FIG. 2 is a diagram illustrating a vehicle provided with a camera monitoring system viewed from the left side.

As illustrated in FIGS. 2 and 3, a moving body 61 may be provided with the first camera 10, the second camera 20, the third camera 30, the monitor 40 and the image processing device 50. The "moving body" according to this embodiment may include, for example, vehicles, ships, aircrafts and the like. Vehicles may include, for example, automobiles, industrial vehicles, rail vehicles, campers, fixed-wing airplanes running on runway, and the like. Automobiles may include, for example, passenger cars, trucks, buses, two-wheel vehicles, trolleybuses and the like. Industrial vehicles may include, for example, agricultural and construction industrial vehicles and the like. Industrial vehicles may include, for example, forklifts, golf carts and the like. Agricultural industrial vehicles may include, for example, tractors, tillers, transplanters, binders, combines, lawn mowers and the like. Construction industrial vehicles may include, for example, bulldozers, scrapers, loading shovels, crane vehicles, dump trucks, road rollers and the like. Vehicles may include human-powered vehicles. Vehicle classification is not limited to the above described examples. For example, automobiles may include industrial vehicles that can travel on the road. Same vehicle may be included in some categories. Ships may include, for example, jet ski bikes, boats, tankers and the like. Aircrafts may include, for example, fixed-wing airplanes, rotor-wing airplanes and the like. FIGS. 2 and 3 illustrate an example where the moving body is a vehicle.

The first camera 10, the second camera 20 and the third camera 30 are devices each configured to capture an image of a range that includes a range specified in United Nations Regulations No. 46 on indirect vision. The first camera 10 captures an image of an area including the left side of a vehicle specified in any one of classes I to VI. The second camera 20 captures an image of an area including the right side of the vehicle specified in any one of classes I to VI. The third camera 30 captures an image of an area including the back of a vehicle specified in any one of classes I to VI.

The first camera 10, the second camera 20 and the third camera 30 may be located at any position inside and outside the moving body 61 as far as they can capture an image of the above described area. In the example illustrated in FIG. 3, the first camera 10 is located on the left side of the moving body 61. In the example illustrated in FIG. 3, the first camera 10 captures an image of a range of class III. In the example illustrated in FIG. 3, the second camera 20 is located on the right side of the moving body 61. In the example illustrated in FIG. 3, the second camera 20 captures an image of a range of class III. In the example illustrated in FIG. 3, the third camera 30 is located behind the moving body 61. In the example illustrated in FIG. 3, the third camera 30 captures an image of a range of class I. The monitor 40 may be located at any position inside the moving body 61. For example, as illustrated in FIG. 2, the monitor 40 is located in a dashboard of the moving body 61. The monitor 40 can be visually confirmed by a driver 62. The image processing device 50 may be located at any position inside the moving body 61.

(First Camera)

As described above, the first camera 10 captures an image of an area including the left side of the vehicle specified as class III. As illustrated in FIG. 1, for example, the first camera 10 includes a first lens 11, a first image sensor 12, a first communication module 13 and a first controller 14.

The first lens 11 forms an object image. For example, the first lens 11 may include an aperture. The first lens 11 may include one or more lenses.

The first image sensor 12 has a plurality of pixels arranged in a two-dimensional array. The first image sensor 12 may include, for example, Charge Coupled Device (CCD) image sensor or Complementary Metal Oxide Semiconductor (CMOS) image sensor. The first image sensor 12 can generate a captured image by capturing an object image formed by the first lens 11.

The first communication module 13 may include a communication interface that can communicate with an external device. The first communication module 13 may transmit/receive information over the network 60. The external device may include the image processing device 50, for example. The "communication interface" according to this disclosure may include a physical connector and a wireless communication device, for example. The physical connector may include an electrical connector corresponding to transmission by electrical signal, an optical connector corresponding to transmission by optical signal and an electromagnetic connector corresponding to transmission by electromagnetic wave. The electrical connector may include a connector conforming to IEC 60603, a connector conforming to the USB standard, a connector corresponding to RCA terminal, a connector corresponding to S terminal specified in EIAJ CP-1211A, a connector corresponding to D terminal specified in EIAJ RC-5237, a connector conforming to HDMI®, and a connector corresponding to a coaxial cable including BNC (British Naval Connector or Baby-series N Connector and the like). The optical connector may include a variety of connectors conforming to IEC 61754. The wireless communication device may include a wireless communication device conforming to Bluetooth® and each standard including IEEE802.11. The wireless communication device includes at least one antenna.

The first controller 14 includes one or more processors. The "processor" in this disclosure may include a processor dedicated to a specific processing and a general-purpose processor that reads in a specific program to execute a specific function. The dedicated processor may include Digital Signal Processor (DSP) and Application Specific Integrated Circuit (ASIC). The processor may include Programmable Logic Device (PLD). The PLD may include Field-Programmable Gate Array (FPGA). The first controller 14 may be either System-on-a-Chip (SoC) in which one or more processors corporate with each other or System In a Package (SiP).

The first controller 14 controls overall operation of the first camera 10. The first controller 14 may apply specific image processing to a captured image generated. For example, the image processing may include exposure adjusting processing, white balance processing, distortion correction processing and the like. The first controller 14 outputs an image captured by the first camera 10 to the image processing device 50 through the first communication module 13.

(Second Camera)

As described above, the second camera 20 captures an image of an area including the right side of the vehicle specified as class III. As illustrated in FIG. 1, the second camera 20 includes a second lens 21, a second image sensor 22, a second communication module 23 and a second controller 24.

The configurations and functions of the second lens 21, the second image sensor 22, the second communication module 23 and the second controller 24 are the same as those of the first lens 11, the first image sensor 12, the first communication module 13 and the first controller 14, respectively, and thus a detailed description thereof will be omitted.

(Third Camera)

As described above, the third camera 30 captures an image of an area including behind the vehicle specified as class I. As illustrated in FIG. 1, the third camera 30 includes a third lens 31, a third image sensor 32, a third communication module 33 and a third controller 34, for example.

The configurations and functions of the third lens 31, the third image sensor 32, the third communication module 33 and the third controller 34 are the same as those of the first lens 11, the first image sensor 12, the first communication module 13 and the first controller 14, respectively, and thus a detailed description thereof will be omitted.

(Monitor)

The monitor 40 may include a display such as a liquid crystal display, Organic Electroluminescence (EL) display and the like. The monitor 40 may display an image input from the image processing device 50 over the network 60, for example. The monitor 40 may serve as a touch screen that can accept an operation by the user. The monitor 40 may include switches or keys that can accept an operation by the user. The switch may include a physical switch and an electronic switch. The key includes a physical key and an electronic key. When accepting an operation by the user, the monitor 40 may transmit an input by the user based on the operation to the image processing device 50.

The monitor 40 converts an electronic signal such as a video signal to an image drawn by a visible light. The monitor 40 displays an image obtained from the image processing device 50. An image obtained by the monitor 40 from the image processing device 50 is an image including a first captured image captured by the first camera 10, a second captured image captured by a second camera 20 and a third captured image captured by the third camera 30. Hereinafter an image including the first captured image, the second captured image and the third captured image is also referred to as a composite image.

(Image Processing Device)

The image processing device 50 includes a communication module 51, a memory 52 and an image processor 53.

The communication module 51 may include a communication interface that can communicate with a variety of external devices. The external device may include, for example, the first camera 10, the second camera 20, the third camera 30, the monitor 40, Electronic Control Unit or Engine Control Unit (ECU) provided in the moving body 61, a speed sensor, an acceleration sensor, a rotation angle sensor, a steering rudder angle sensor, an engine speed sensor, an accelerator sensor, a brake sensor, an illuminance sensor, a raindrop sensor, a travel distance sensor, a millimeter-wave radar, an obstacle detection device using a ultrasonic sonar, Electronic Toll Collection System (ETC) receiver, Global Positioning System (GPS) device, a navigation device, an internet server, a mobile phone and the like.

The communication module 51 may include a communication interface for inter-pedestrian/vehicle communication, inter road/vehicle communication and inter vehicle communication. The communication module 51 may include a receiver corresponding to an optical beacon of Dedicated Short-Range Communication (DSRC: narrow band communication system) and Vehicle Information and Communication System (VICS®) provided in Japan. The communication module 51 may include a receiver corresponding to a road traffic information providing system in other countries.

The communication module 51 may be able to receive a variety of information from an external device. For example, the communication module 51 may be able to obtain the moving body information and the environmental information.

The moving body information may include any information about the moving body 61. The moving body information may include, for example, speed, acceleration, turning gravity, inclination, direction and turning situation of the moving body 61, rudder angle of the steering wheel, temperature of cooling water, amount of fuel remaining, amount of battery remaining, battery voltage, engine speed, gear position, presence of reverse signal, presence of accelerator operation, accelerator opening, presence of brake operation, brake depressing degree, presence of parking brake operation, difference in rotation numbers between front-rear wheels or among four wheels, pneumatic pressure of tire, amount of damper extension/contraction, eye space position of a driver, number of crews and position of seats, seat belt wearing information, opening and closing of a door, opening and closing of a window, in-vehicle temperature, presence of air conditioner operation, air conditioner setting temperature, blast volume of air conditioner, air circulation setting, wiper operating state, traveling mode, information of connection with an external device, current time, average fuel consumption, instantaneous fuel consumption, lighting state of each lamp, position information of the moving body 61 and the routing information of the moving body 61 to the destination, and the like. Each lamp may include, for example, a head lamp, a fog lamp, a back lamp, a position lamp and a turn signal.

The environmental information may include any information about the external environment of the moving body 61. The environmental information may include, for example, brightness around the moving body 61, weather, atmospheric pressure, ambient temperature, map information, traffic information, road information, road work information, temporary change of speed limit of a traveling path, an object detected by the other vehicle and lighting state of a traffic light.

The memory 52 may include a temporary memory and a secondary memory. The memory 52 may be constituted by using a semiconductor memory, a magnetic memory, an optical memory and the like. The semiconductor memory may include a volatile memory and a non-volatile memory. The magnetic memory may include a hard disc, a magnetic tape and the like. The optical memory may include, for example, Compact Disc (CD), Digital Versatile Disc (DVD) and Blu-ray Disc® (BD). The memory 52 stores a variety of information and program required for operating the image processing device 50.

The image processor 53 includes one or more processors. The image processor 53 controls overall operation of the image processing device 50.

The image processor 53 obtains, through the communication module 51, a first captured image from the first camera 10, a second captured image from the second camera 20, and a third captured image from the third camera 30.

The image processor 53 generates a composite image including a first captured image, a second captured image and a third captured image, and transmits a generated composite image to the monitor 40 through the communication module 51.

The image processor 53 may obtain the moving body information and the environmental information from the external device through the communication module 51. The image processor 53 controls a layout of the composite image according to at least either the moving body information or the environmental information.

The layout means a shape of each image included in a composite image, a size of each image included in a composite image, and arrangement of each image in a composite image. When a shape or a size of each image is changed due to change of the layout, a range of outside area displayed by each image may be changed.

When generating a composite image, the image processor 53 may extract a necessary range from the first captured image. When making the first captured image into a horizontally long shape, for example, the image processor 53 extracts a horizontally long range from the obtained first captured image to generate a composite image. When making the first captured image into a vertically long shape, for example, the image processor 53 extracts a vertically long range from the obtained first captured image to generate a composite image. As with the first captured image, the image processor 53 may also extract a necessary range with respect to the second captured image and the third captured image.

Hereinafter a state where the image processor 53 makes the first captured image and the second captured image into vertically long shapes in a composite image is also referred to as a first mode, and a state where the image processor 53 makes the first captured image and the second captured image into horizontally long shapes in a composite image is also referred to as a second mode.

Figure 4A:
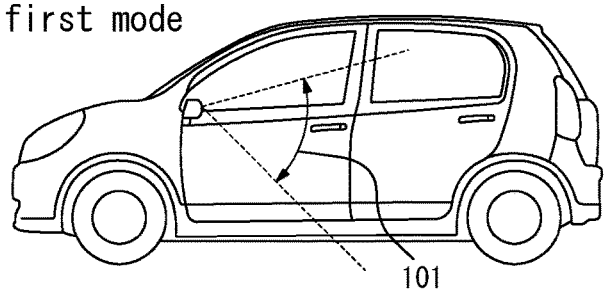
FIG. 4A is a side view of an example of a display range in a first mode.
Figure 4B:
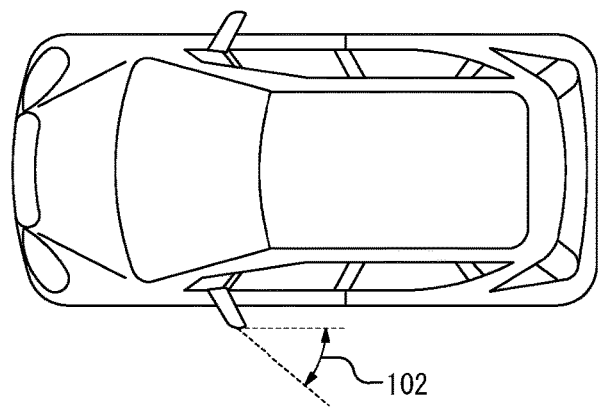
FIG. 4B is a top view of the example of the display range in the first mode.
Figure 4C:
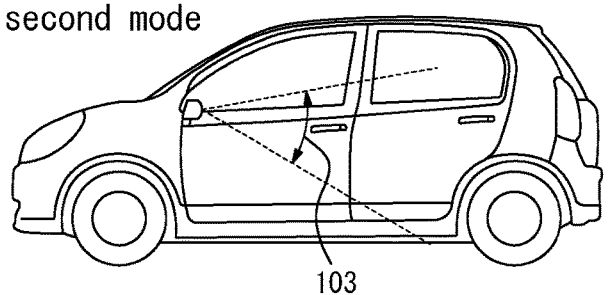
FIG. 4C is a side view of the example of the display range in a second mode and FIG. 4D is a top view of the example of the display range in the second mode.
Figure 4D:
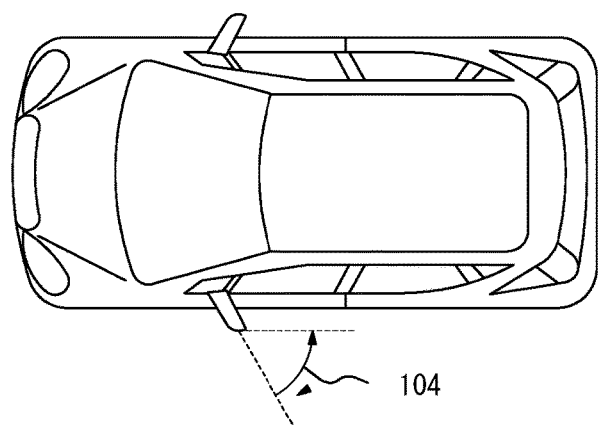

FIGS. 4A to 4D each illustrates an example of a display range of the first captured image in the first mode and the second mode. FIG. 4A is a side view in the first mode. FIG. 4B is a top view in the first mode. FIG. 4C is a side view in the second mode. FIG. 4D is a top view in the second mode.

When comparing FIG. 4A with FIG. 4C, the vertical range 101 of the first captured image used in the first mode is larger than the vertical range 103 of the first captured image displayed in the second mode. When comparing FIG. 4B with FIG. 4D, the horizontal range 104 of the first captured image displayed in the second mode is larger than the horizontal range 102 of the first captured image displayed in the first mode.

The image processor 53 controls such that the first captured image and the second captured image are displayed in either the first mode or the second mode to allow the driver 62 to confirm an appropriate range according to the moving body information and the environmental information.

For example, it is important for the driver 62 to visually confirm a range near a vehicle when travelling at a normal speed or backing into a parking space. Therefore the image processor 53 controls such that the first captured image and the second captured image are displayed in the first mode. For example, it is important for the driver 62 to visually confirm a horizontal direction widely when travelling at a high speed, turning right/left, changing a lane and travelling on a road having multiple lanes. Therefore the image processor 53 controls such that the first captured image and the second captured image are displayed in the second mode. When detecting that the moving body 61 travels at a predetermined speed or more, the image processor 53 determines that the moving body 61 is traveling at a high-speed. The image processor 53 can detect that the moving body 61 is turning right/left or changing a lane through lighting of a turn signal. The image processor 53 can detect that the moving body 61 is turning right/left or changing a lane through detection of operation of a turn signal switch.

The image processor 53 can detect the speed of the moving body 61, if the gear of the moving body 61 is set to reverse, if the turn signal switch is operated and the like from the moving body information. The image processor 53 can detect if the moving body 61 travels on a road having multiple lanes and the like from the environmental information. The image processor 53 can detect if the moving body 61 travels on a road having multiple lanes from the road information obtained from the navigation device.

Figure 5:
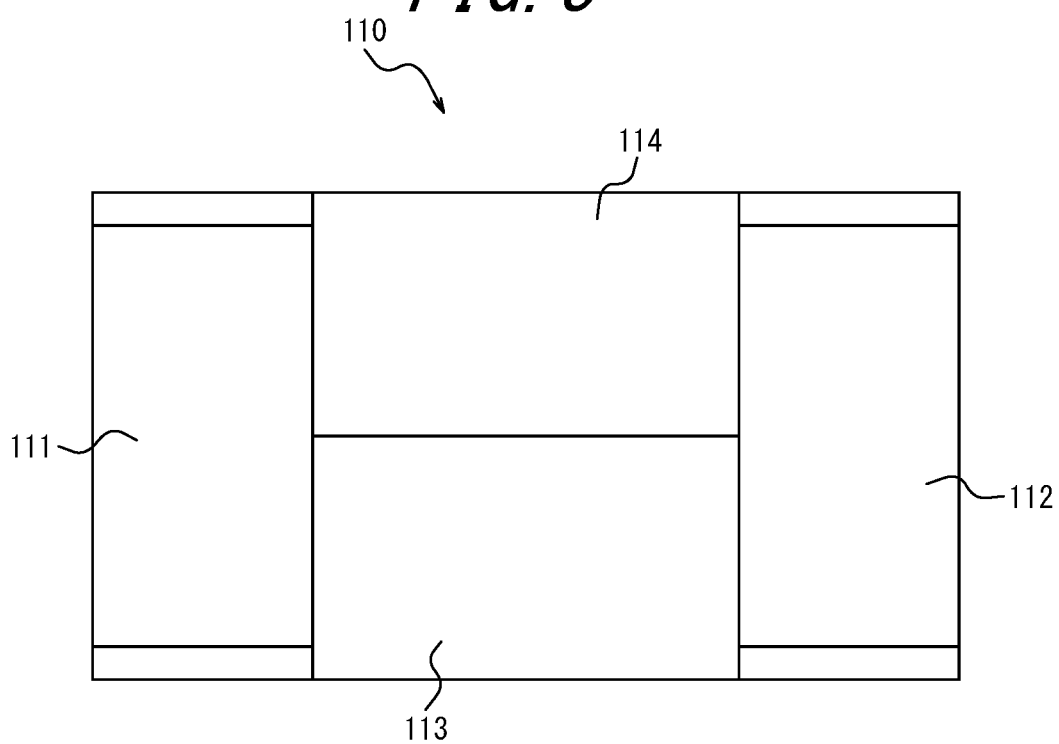
FIG. 5 is an example of a layout when images on the left side and on the right side are displayed vertically long.

FIG. 5 illustrates an example of a layout of the composite image 110 in the first mode. In the example illustrated in FIG. 5, the first captured image 111 is displayed vertically long on the left side. The second captured image 112 is displayed vertically long on the right side. The third captured image 113 is displayed horizontally long on the lower middle portion. The other image 114 is displayed on the upper middle portion. The other image 114 may be, for example, an image from a car navigation or an image from a circumference monitoring camera.

Figure 6:
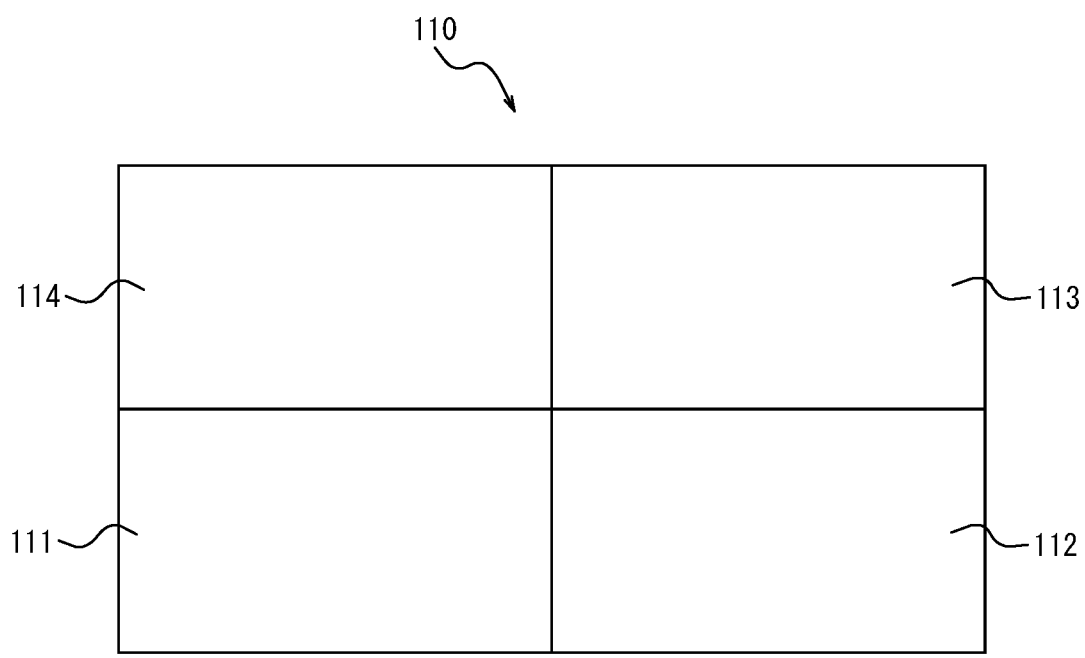
FIG. 6 is an example of a layout when images on the left side and on the right side are displayed horizontally long.

FIG. 6 illustrates an example of a layout of the composite image 110 in the second mode. In the example illustrated in FIG. 6, the first captured image 111 is displayed horizontally long on the lower left. The second captured image 112 is displayed horizontally long on the lower right. The third captured image 113 is displayed horizontally long on the upper right. The other image 114 is displayed on the upper left. The other image 114 may be an image from a car navigation or an image from a circumference monitoring camera.

(Composite Image Variations)

FIGS. 7A and 7B and FIGS. 8A and 8B are diagrams each illustrating an example of a layout in which the vertical length of the composite image is shorter than that of FIG. 5 and FIG. 6.

Figure 7A:
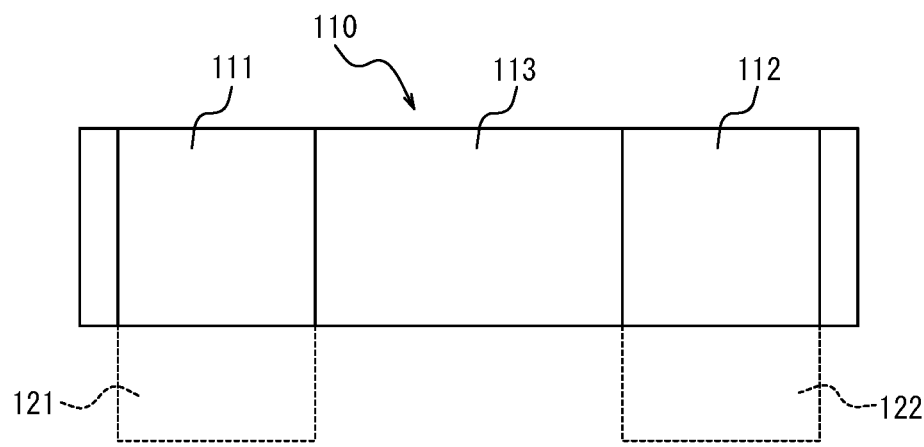
FIGS. 7A and 7B are examples of a layout when images on the left side and on the right side are extracted and displayed.
Figure 7B:
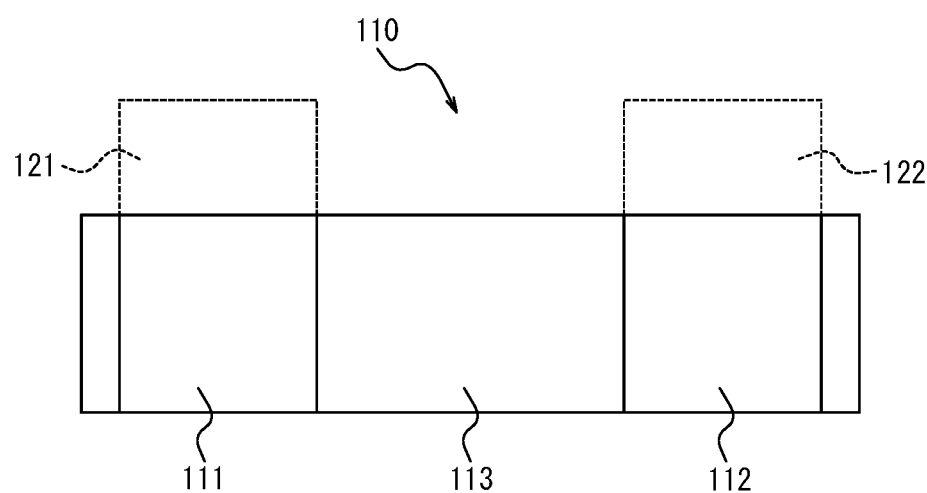

FIGS. 7A and 7B are layout variations in the first mode. In the example illustrated in FIG. 7A, the first captured image 111 is displayed on the left side. The first captured image 111 is a portion extracted from the vertically long image so as to remove the lower protruded portion 121. The second captured image 112 is displayed on the right side. The second captured image 112 is a portion extracted from the vertically long image so as to remove the lower protruded portion 122. The third captured image 113 is displayed on the middle. The layout illustrated in FIG. 7A is suitable when the moving body 61 is travelling at a normal speed.

In the example illustrated in FIG. 7B, the first captured image 111 is displayed on the left side. The first captured image 111 is a portion extracted from the vertically long image so as to remove the upper protruded portion 121. The second captured image 112 is displayed on the right side. The second captured image 112 is a portion extracted from the vertically long image so as to remove the upper protruded portion 122. The third captured image 113 is displayed on the middle. The layout illustrated in FIG. 7B is suitable when the moving body 61 is backing into a parking space.

Figure 8A:
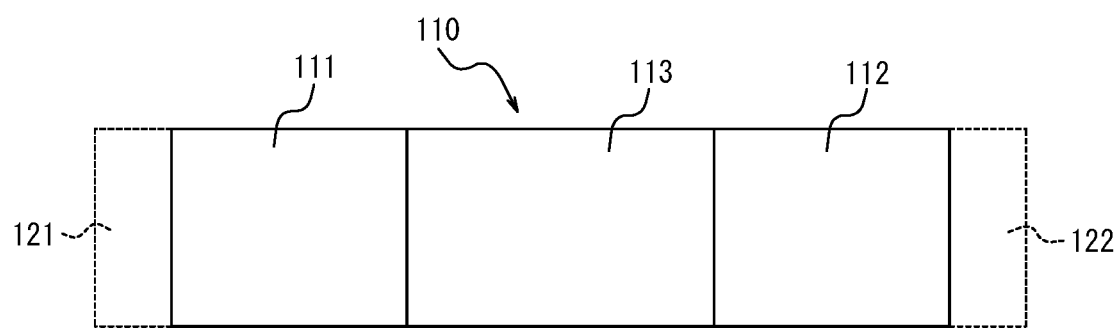
FIGS. 8A and 8B are examples of a layout when images on the left side and on the right side are extracted and displayed.
Figure 8B:
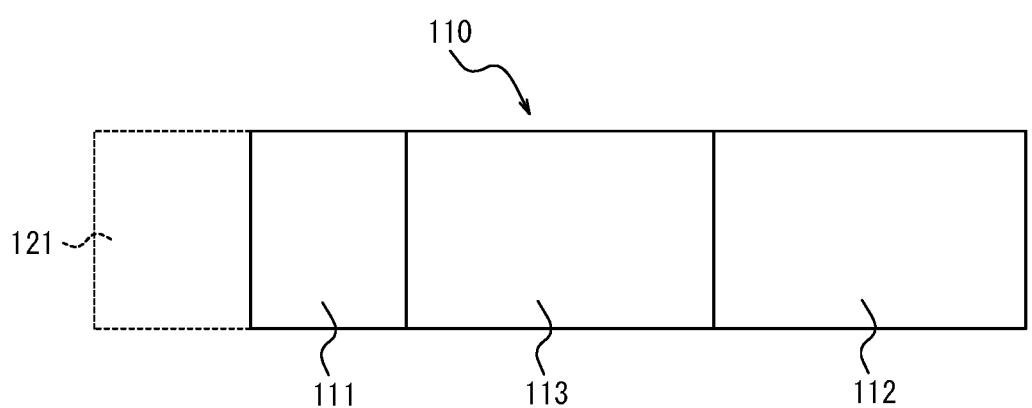

FIGS. 8A and 8B are layout variations in the second mode. In the example illustrated in FIG. 8A, the first captured image 111 is displayed on the left side. The first captured image 111 is a portion extracted from the horizontally long image so as to remove the left protruded portion 121. The second captured image 112 is displayed on the right side. The second captured image 112 is a portion extracted from the horizontally long image so as to remove the right protruded portion 122. The third captured image 113 is displayed on the middle. In FIG. 8A, the size of the first captured image 111 is the same as that of the second captured image 112. The layout illustrated in FIG. 8A is suitable when the moving body 61 is travelling at a high speed, for example.

In the example illustrated in FIG. 8B, the first captured image 111 is displayed on the left side. The first captured image 111 is a portion extracted from the horizontally long image so as remove the left protruded portion 121. The second captured image 112 is displayed on the right side. The third captured image 113 is displayed on the middle. In FIG. 8B, the second captured image 112 is larger than the first captured image 111 in size. The layout illustrated in FIG. 8B is suitable when the moving body 61 turns right or merges into a fast lane, for example.

(Variation 1)

A camera monitoring system 2 according to Variation 1 of an embodiment of this disclosure will be described with reference to FIG. 9.

Figure 9:
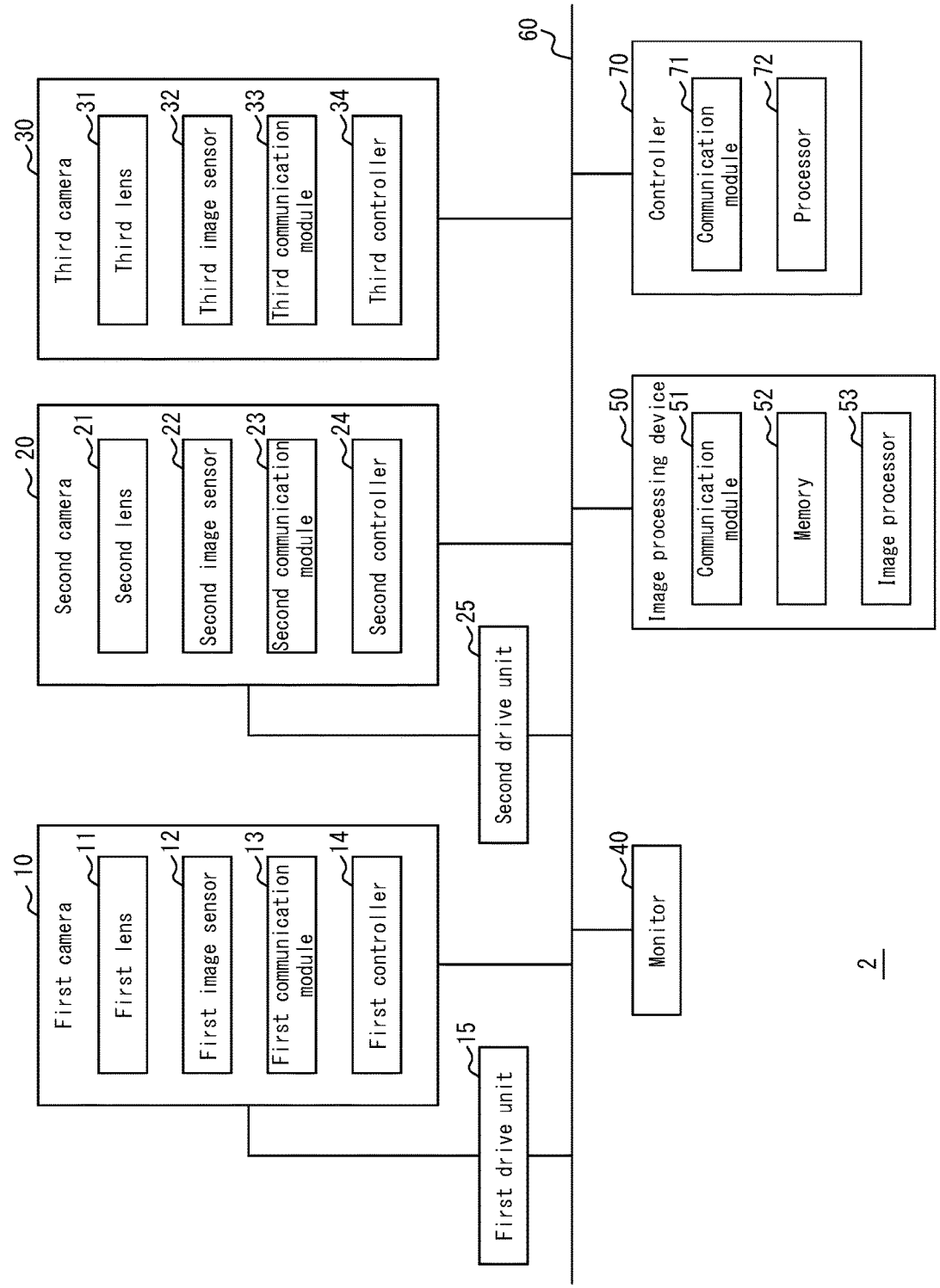
FIG. 9 is a block diagram illustrating a schematic configuration of a camera monitoring system according to Variation 1 of an embodiment of this disclosure.

As illustrated in FIG. 9, the camera monitoring system 2 according to Variation 1 has a first camera 10, a first drive unit 15, a second camera 20, a second drive unit 25, a third camera 30, a monitor 40, an image processing device 50 and a controller 70.

The first drive unit 15 drives rotation of the first camera 10. The first drive unit 15 can rotate the first camera 10 without changing an optical axis or can rotate the first camera 10 with the optical axis tilted.

The second drive unit 25 drives rotation of the second camera 20. The second drive unit 25 can rotate the second camera 20 without changing the optical axis or can rotate the second camera 20 with the optical axis tilted.

The controller 70 controls the operation of the first drive unit 15 and the second drive unit 25. The controller 70 includes a communication module 71 and a processor 72.

The communication module 71 may include a communication interface that can communicate with a variety of external devices. Examples of the external device may include, for example, the first camera 10, the first drive unit 15, the second camera 20, the second drive unit 25, the third camera 30, the monitor 40, the image processing device 50, Electronic Control Unit or Engine Control Unit (ECU) provided in the moving body 61, a speed sensor, an acceleration sensor, a rotation angle sensor, a steering rudder angle sensor, an engine speed sensor, an accelerator sensor, a brake sensor, an illuminance sensor, a raindrop sensor, a travel distance sensor, a millimeter-wave radar, an obstacle detection device using a ultrasonic sonar, Electronic Toll Collection System (ETC) receiver, Global Positioning System (GPS) device, a navigation device, an internet server, a mobile phone and the like.

The communication module 71 may include a communication interface for inter-pedestrian/vehicle communication, inter road/vehicle communication and inter vehicle communication. The communication module 71 may include a receiver corresponding to an optical beacon of Dedicated Short-Range Communication (DSRC: narrow band communication system) and Vehicle Information and Communication System (VICS) provided in Japan. The communication module 71 may include a receiver corresponding to a road traffic information providing system provided in other countries.

The communication module 71 may be able to obtain a variety of information from an external device. For example, the communication module 71 may be able to obtain the moving body information and the environmental information.

The processor 72 includes one or more processors. The processor 72 controls overall operation of the controller 70.

The processor 72 controls operation of the first drive unit 15 and the second drive unit 25.

In the camera monitoring system 2 according to Variation 1, the first lens 11 of the first camera 10 and the second lens 21 of the second camera 20 are not super-wide-angle lenses. Thus, for example, the range of the first captured image captured by the first camera 10 is not wide enough to allow both vertically and horizontally long images each including a desired range to be extracted from the first captured image.

The super-wide-angle range needs a lot of lenses to secure the performance. Thus there is an increase in size of the lens, which causes an increase in cost. The camera monitoring system 2 according to Variation 1 does not need the first lens 11 and the second lens 21 to be super-wide-angle lenses, and thus a cost can be reduced.

The first image sensor 12 and the second image sensor 22 of the camera monitoring system 2 according to Variation 1 captures an image of a rectangular range. The first drive unit 15 can dispose the first captured image horizontally long or vertically long by rotating the first camera 10. The second drive unit 25 can dispose the second captured image horizontally long or vertically long by rotating the second camera 20.

Figure 10A:
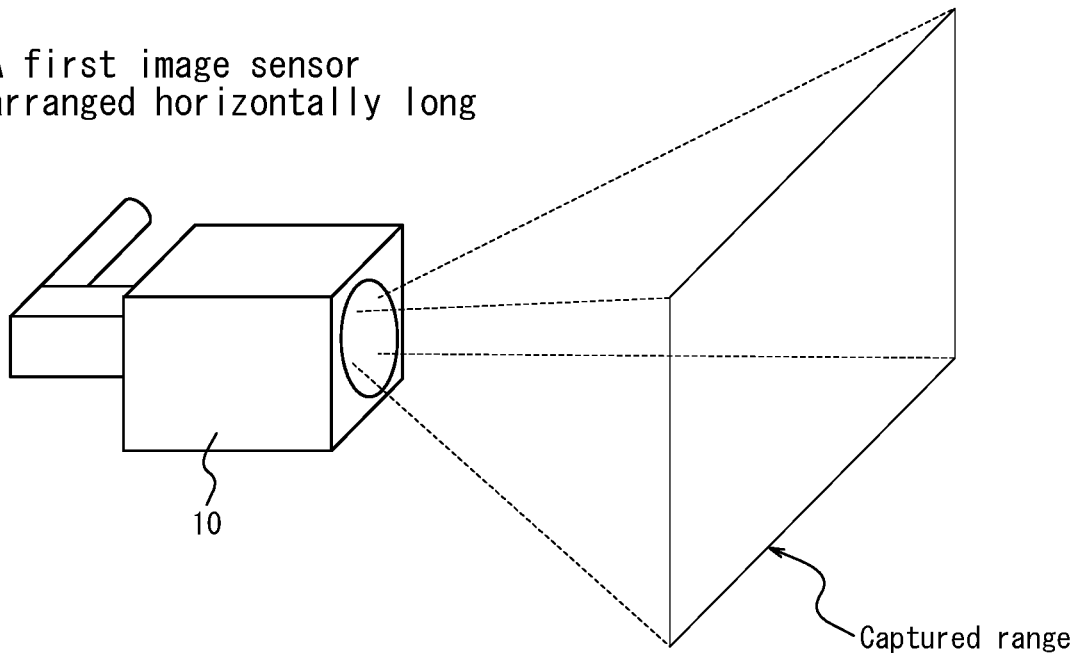
FIG. 10A is a diagram illustrating a captured range when an image sensor is disposed horizontally and FIG. 10B is a diagram illustrating a captured range when the image sensor is disposed vertically.
Figure 10B:
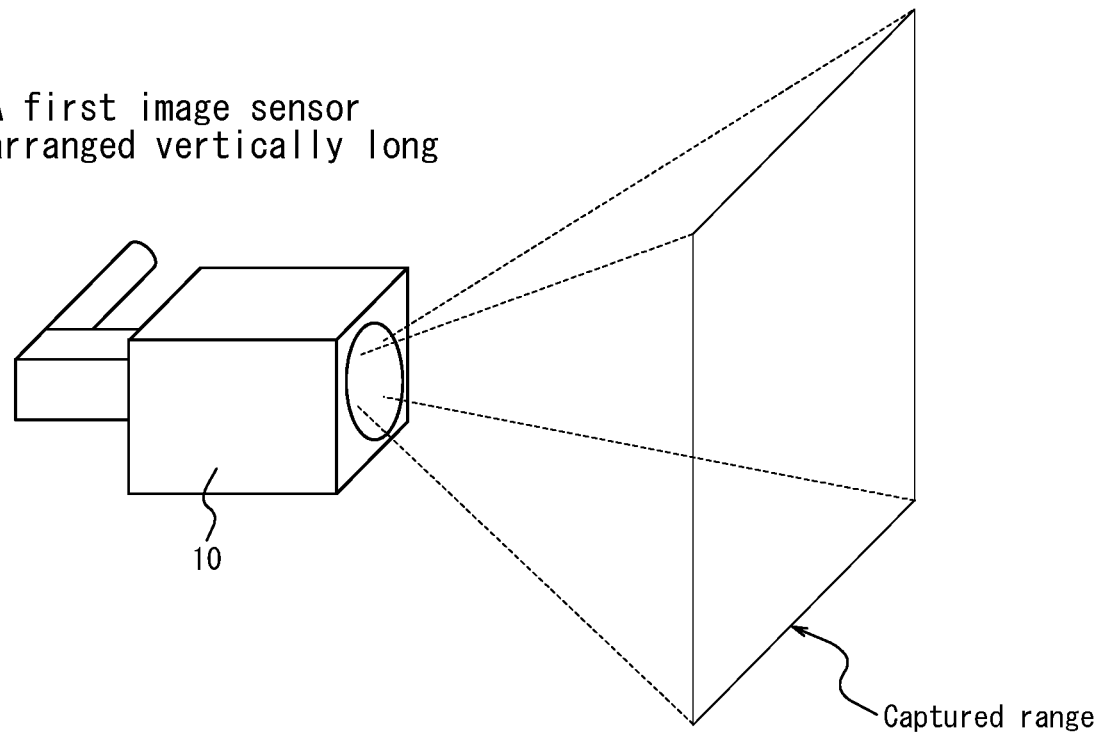

FIG. 10A illustrates a state of the captured range when the first image sensor 12 is disposed horizontally long. FIG. 10B illustrates a state of the captured range when the first image sensor 12 is disposed vertically long. When disposed as illustrated in FIG. 10A, the first captured image is horizontally long, and when disposed as illustrated in FIG. 10B, the first captured image is vertically long.

When the first drive unit 15 rotates the first camera 10, the first controller 14 of the first camera 10 converts the first captured image such that the upper portion of the first camera 10 coincides with the upper portion of the first captured image, and transmits the first captured image to the image processing device 50. Conversion of the first captured image may be performed by the image processor 53 of the image processing device 50.

When the second drive unit 25 rotates the second camera 20, the second controller 24 of the second camera 20 converts the second captured image such that the upper portion of the second camera 20 coincides with the upper portion of the second captured image, and transmits the second captured image to the image processing device 50. Conversion of the second captured image may be performed by the image processor 53 of the image processing device 50.

FIGS. 11A to 11D each illustrates an example of a captured range of the first camera 10 in the first mode and the second mode. In each example illustrated in FIGS. 11A to 11D, the first drive unit 15 rotates the first camera 10 without changing the optical axis.

Figure 11A:
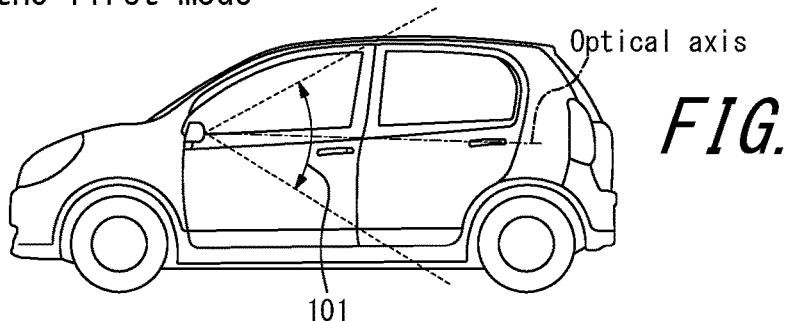
FIG. 11A is a side view of an example of a captured range in a first mode.
Figure 11B:
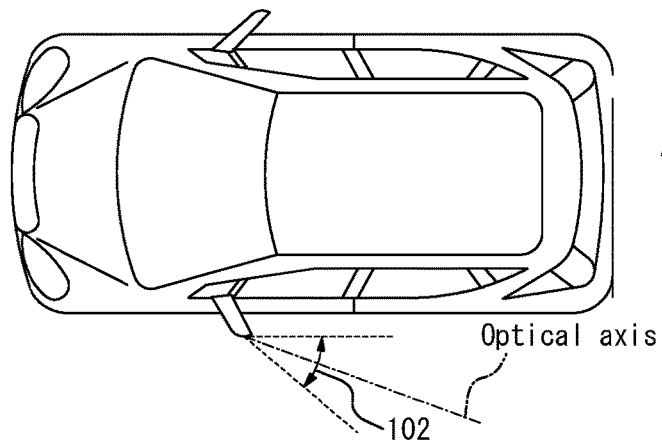
FIG. 11B is a top view of the example of the captured range in the first mode.
Figure 11C:
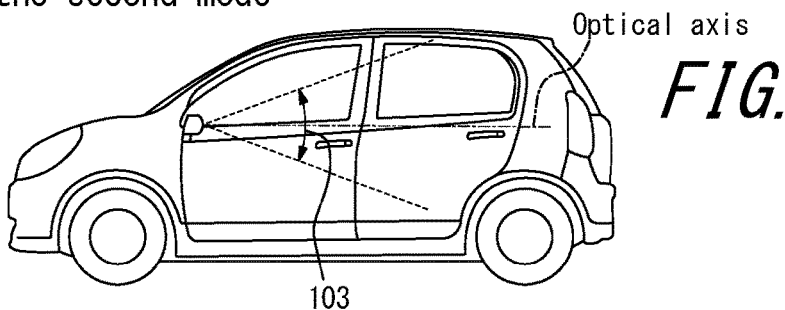
FIG. 11C is a side view of the example of the captured range in a second mode.
Figure 11D:
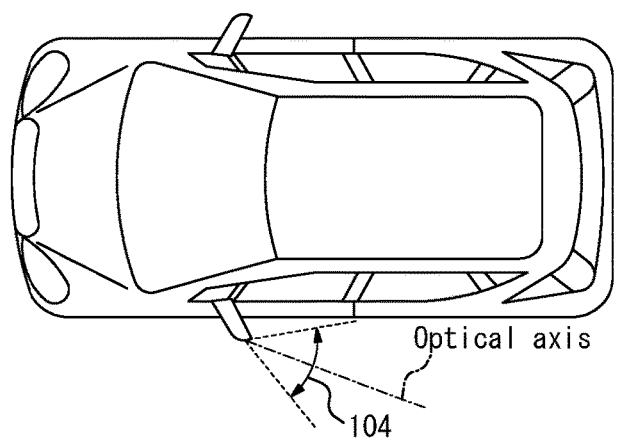
FIG. 11D is a top view of the example of the captured range in the second mode.

FIG. 11A is a side view in the first mode. FIG. 11B is a top view in the first mode. FIG. 11C is a side view in the second mode. FIG. 11D is a top view in the second mode.

When comparing FIG. 11A with FIG. 11C, the vertical range 101 captured by the first camera 10 in the first mode is larger than the vertical range 103 captured by the first camera 10 in the second mode. When comparing FIG. 11B with FIG. 11D, the horizontal range 104 captured by the first camera 10 in the second mode is larger than the horizontal range 102 of the first captured image captured by the first camera 10 in the first mode.

FIGS. 12A to 12D each illustrates an example of a captured range of the first camera 10 in the first mode and the second mode. In each example illustrated in FIGS. 12A to 12D, the first drive unit 15 rotates the first camera 10 with the optical axis tilted. In each example illustrated in FIGS. 12A to 12D, in the second mode, the first drive unit 15 sets the orientation of the optical axis more upward and outward than that in the first mode. In this manner, the orientation of the optical axis is changed depending on whether the mode is the first mode or the second mode, and as a result the driver 62 can observe a range suitable for the situation.

Figure 12A:
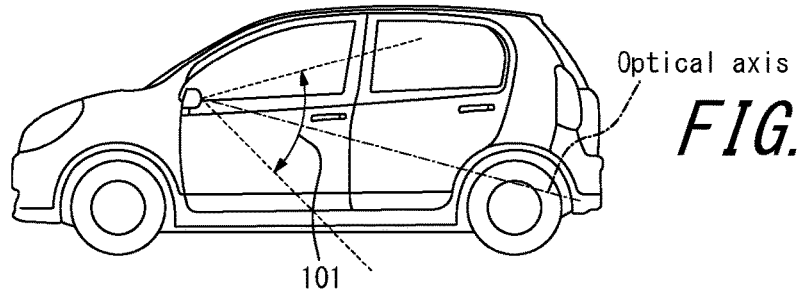
FIG. 12A is a side view of another example of a captured range in a first mode.
Figure 12B:
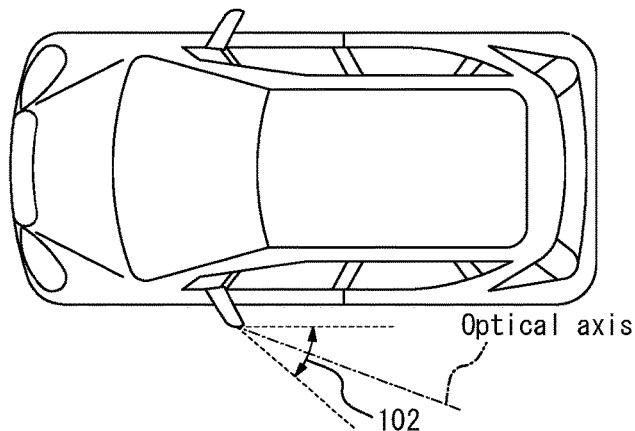
FIG. 12B is a top view of another example of the captured range in the first mode.
Figure 12C:
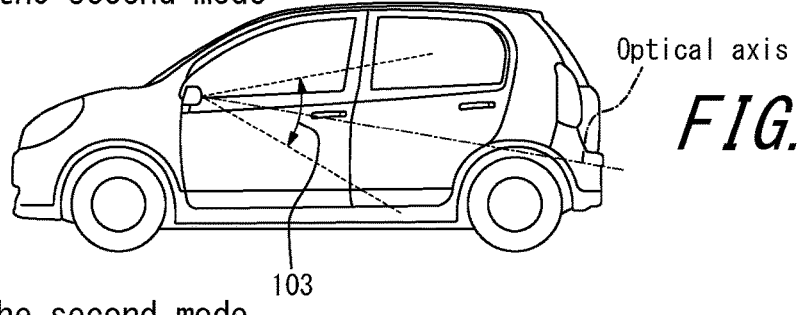
FIG. 12C is a side view of another example of the captured range in a second mode.
Figure 12D:
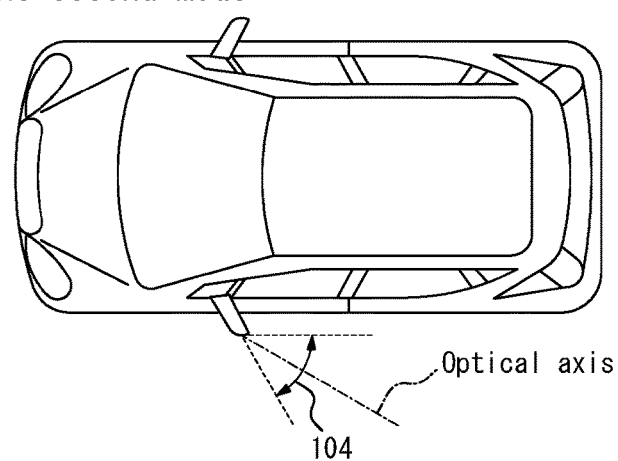
FIG. 12D is a top view of another example of the captured range in the second mode.

FIG. 12A is a side view in the first mode, FIG. 12B is a top view in the first mode, FIG. 12C is a side view in the second mode, and FIG. 12D is a top view in the second mode.

When comparing FIG. 12A with FIG. 12C, the vertical range 101 captured by the first camera 10 in the first mode is larger than the vertical range 103 captured by the first camera 10 in the second mode. When comparing FIG. 12B with FIG. 12D, the horizontal range 104 captured by the first camera 10 in the second mode is larger than the horizontal range 102 of the first captured image captured by the first camera 10 in the first mode.

Figure 13:
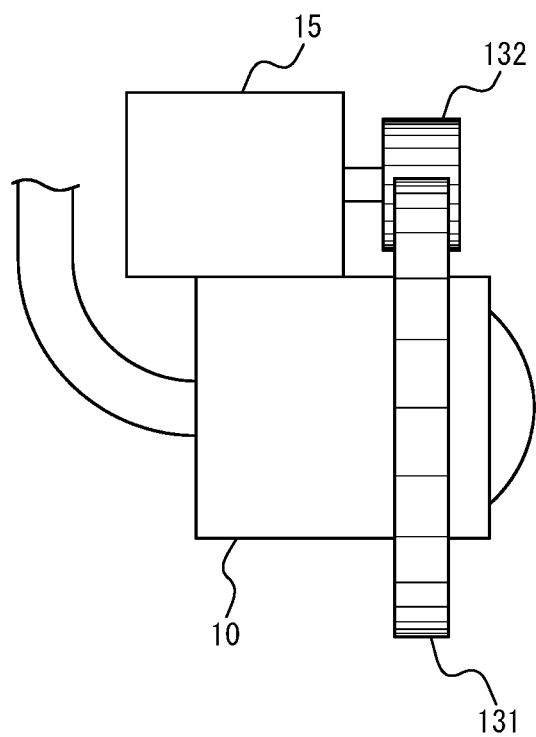
FIG. 13 is a diagram illustrating an example of a mechanism configured to rotate an entire camera by a drive unit.

FIG. 13 illustrates an example of a mechanism for rotating the first camera 10 by the first drive unit 15. The first camera 10 has a gear 131 fixed to a housing of the first camera 10. The first drive unit 15 has a gear 132 engaged with the gear 131. The first drive unit 15 drives the gear 131 by rotating the gear 132 to rotate the first camera 10. With the same mechanism, the second drive unit 25 can rotate the second camera 20.

(Variation 2)

A camera monitoring system 3 according to Variation 2 of an embodiment of this disclosure will be described with reference to FIG. 14.

Figure 14:
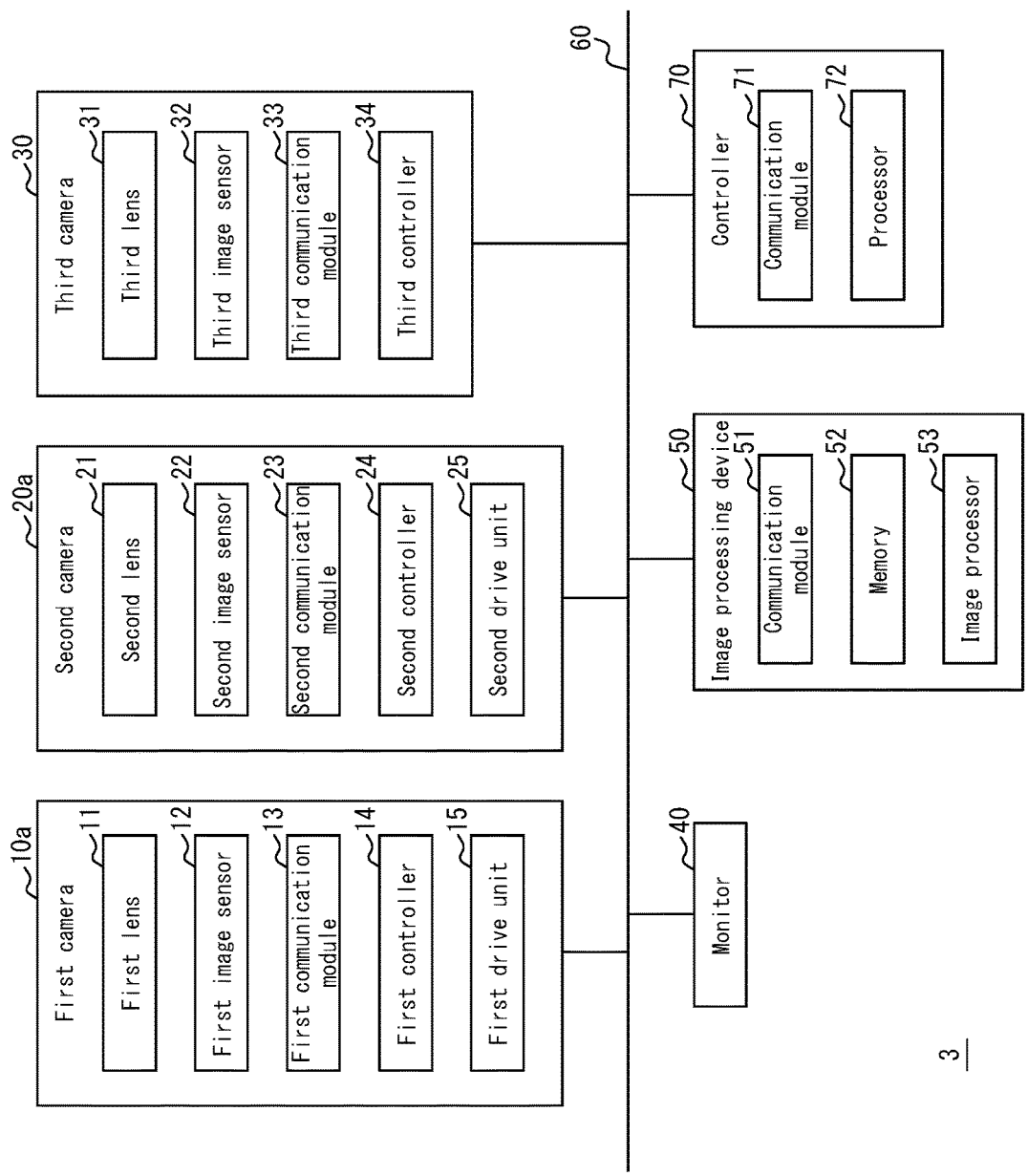
FIG. 14 is a block diagram illustrating a schematic configuration of a camera monitoring system according to Variation 2 of an embodiment of this disclosure.

As illustrated in FIG. 14, the camera monitoring system 3 according to Variation 2 has a first camera 10a, a second camera 20a, a third camera 30, a monitor 40, an image processing device 50 and a controller 70.

The first camera 10a includes a first drive unit 15 in addition to those included in the first camera 10 illustrated in FIG. 1. The second camera 20a includes a second drive unit 25 in addition to those included in the second camera 20 illustrated in FIG. 1.

The first drive unit 15 integrally drives and rotates the first lens 11 and the first image sensor 12, or drives and rotates only the first image sensor 12.

The second drive unit 25 integrally drives and rotates the second lens 21 and the second image sensor 22, or drives and rotates only the second image sensor 22.

Figure 15:
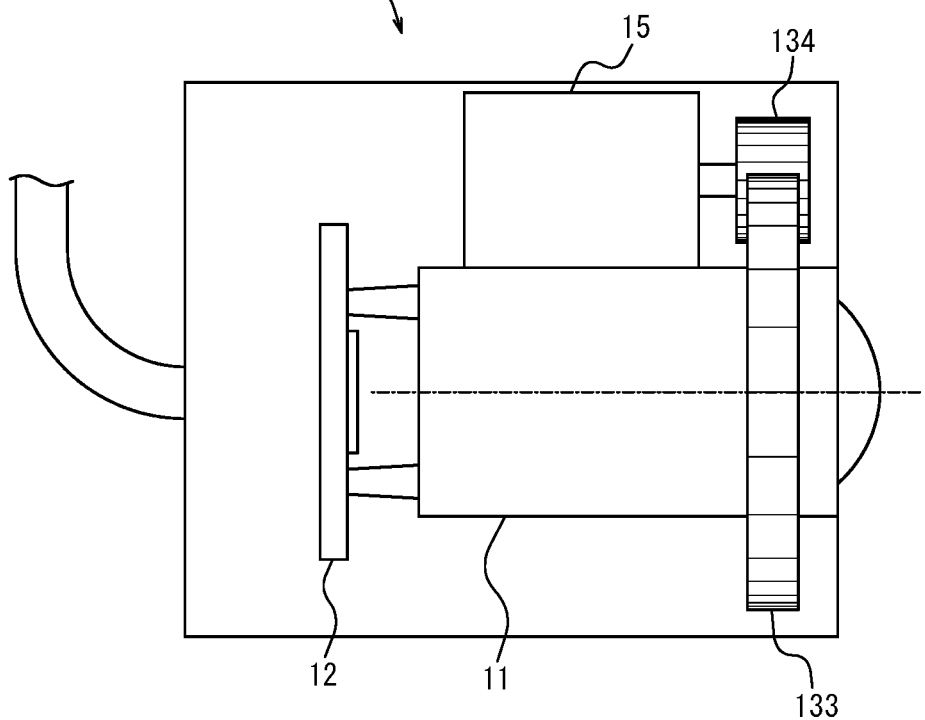
FIG. 15 is a diagram illustrating an example of a mechanism configured to rotate a camera and an image sensor by a drive unit.

FIG. 15 illustrates an example of a mechanism in which the first drive unit 15 integrally rotates the first lens 11 and the first image sensor 12. The first lens 11 and the first image sensor 12 are coupled such that they are integrally rotated. The first lens 11 has a gear 133 fixed to the first lens 11. The first drive unit 15 includes a gear 134 engaged with the gear 133. The first drive unit 15 drives the gear 133 by rotating the gear 134 to integrally rotate the first lens 11 and the first image sensor 12. With the same mechanism, the second drive unit 25 can integrally rotate the second lens 21 and the second image sensor 22.

Figure 16:
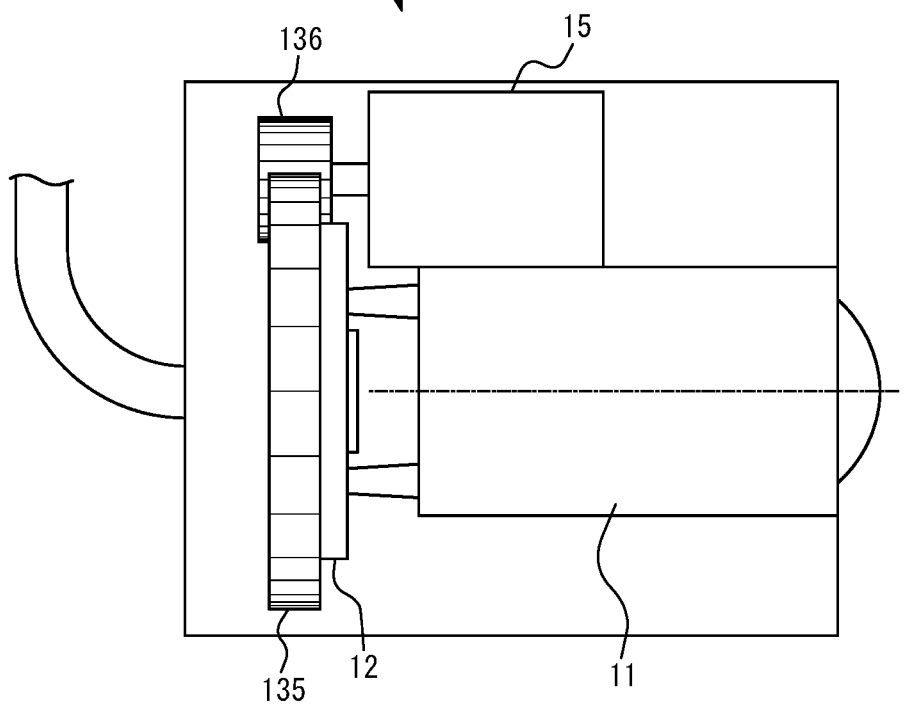
FIG. 16 is a diagram illustrating an example of a mechanism configured to rotate an image sensor by a drive unit.

FIG. 16 illustrates an example of a mechanism in which the first drive unit 15 rotates only the first image sensor 12. The first lens 11 and the first image sensor 12 are configured such that the first image sensor 12 can rotate independently from the first lens 11. The first image sensor 12 has a gear 135 fixed to the first image sensor 12. The first drive unit 15 includes a gear 136 engaged with the gear 135. The first drive unit 15 drives the gear 135 by rotating the gear 136 to rotate only the first image sensor 12. With the same mechanism, the second drive unit 25 can rotate only the second image sensor 22.

Variation 2 is the same as Variation 1 except the rotation mechanism, and thus explanation thereof will be omitted.

(Variation 3)

A camera monitoring system 4 according to Variation 3 of an embodiment of this disclosure will be described with reference to FIG. 17.

Figure 17:
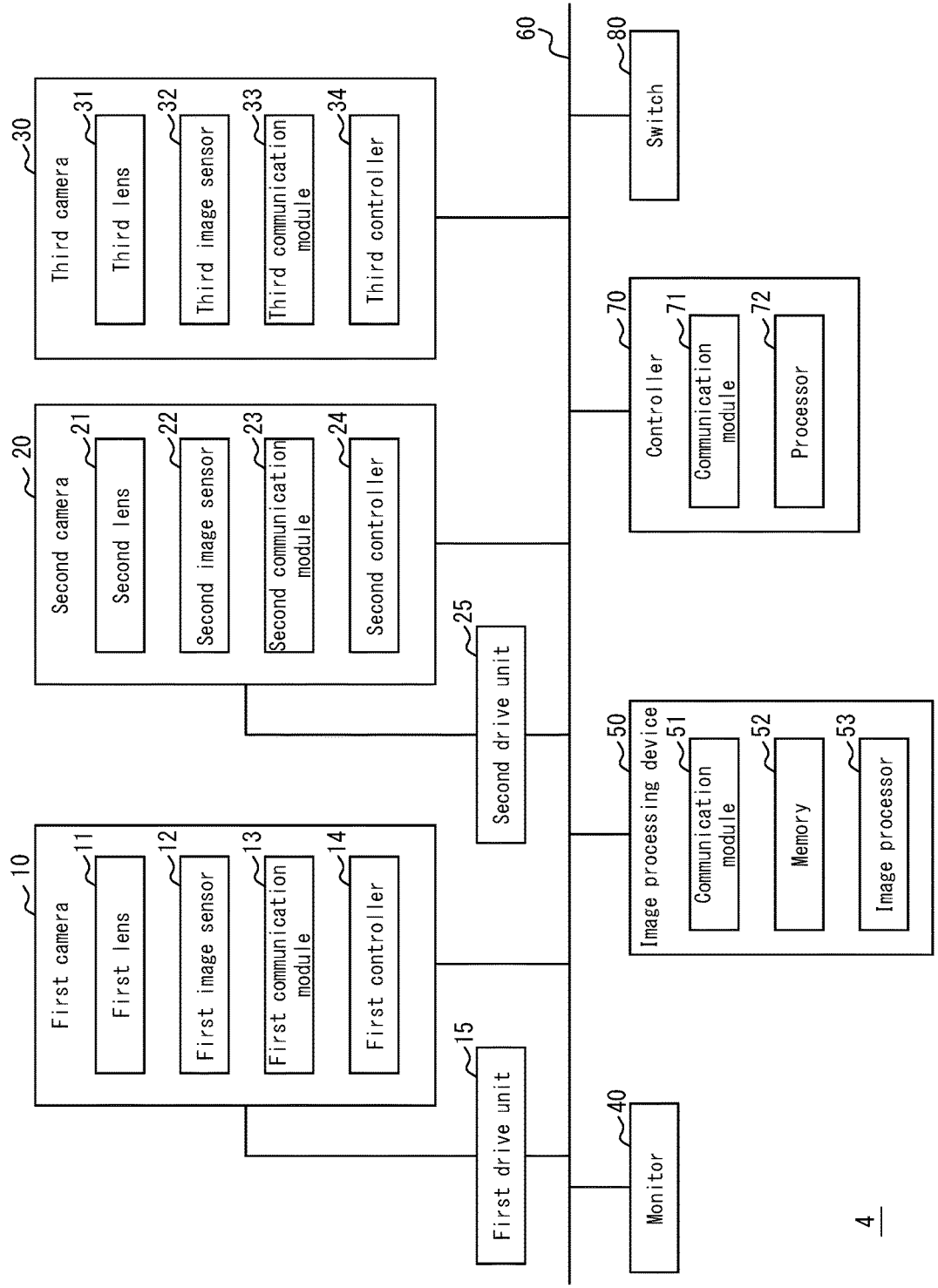
FIG. 17 is a block diagram illustrating a schematic configuration of a camera monitoring system according to Variation 3 of an embodiment of this disclosure.

As illustrated in FIG. 17, the camera monitoring system 4 according to Variation 3 includes a switch 80 in addition to those included in the camera monitoring system 2 according to Variation 1.

The switch 80 is a switch configured to switch between the first mode and the second mode. When the driver 62 switches to the first mode by the switch 80, the first drive unit 15 rotates the first camera 10 such that the first captured image will be vertically long. Further, the second drive unit 25 rotates the second camera 20 such that the second captured image will be vertically long. When the driver 62 switches to the second mode by the switch 80, the first drive unit 15 rotates the first camera 10 such that the first captured image will be horizontally long. Further, the second drive unit 25 rotates the second camera 20 such that the second captured image will be horizontally long.

Figure 18:
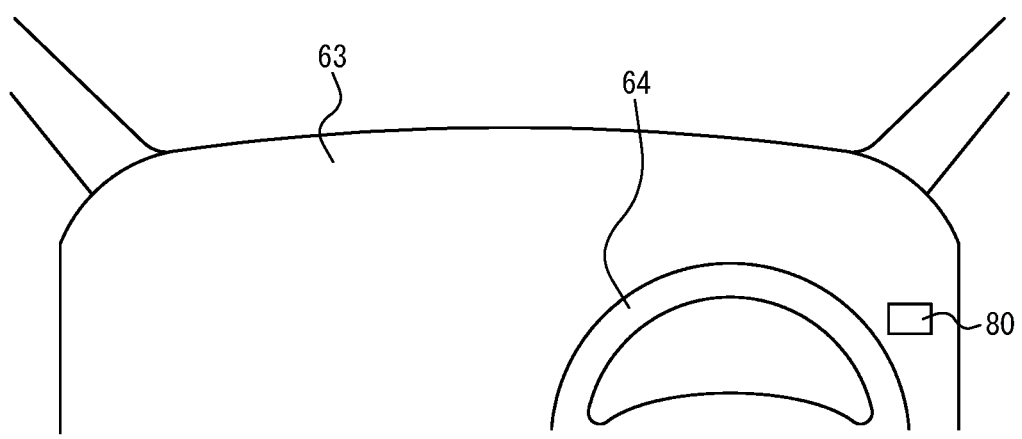
FIG. 18 is a diagram illustrating an example of switch layout in a vehicle.

The switch 80 may be located at any position in the moving body 61 as far as the driver 62 can operates it during driving of the moving body 61. For example, as illustrated in FIG. 18, the switch 80 is located on the right on the dashboard 63 behind the steering wheel 64. The switch 80 may be attached to the steering wheel 64. The switch 80 is not limited to a physical switch, and may be displayed as a switch button on a display of car navigation.

As described above, according to the camera monitoring systems 1 to 4 of an embodiment, the image processor 53 changes a layout of a composite image including a first captured image, a second captured image and a third captured image according to at least either the moving body information or the environmental information. The driver 62 who visually confirms a composite image can recognize an area suitable for the state of the moving body 61. Thus the technical convenience of displaying a captured image of outside the moving body 61 is improved.

Although this disclosure has been described on the basis of the figures and the embodiments, it is to be understood that various changes and modifications may be implemented on the basis of this disclosure by those who are ordinarily skilled in the art. Accordingly, such changes and modifications are included in the scope of the disclosure herein. For example, functions and the like included in each means, each step and the like may be rearranged without logical inconsistency. A plurality of means or steps can be combined into one or divided.

For example, each component and function of each of camera monitoring systems 1 to 4 according to the above described embodiment may be rearranged. For example, a part or all of components and functions of the image processing device 50 may be included in any one of the first camera 10, the second camera 20, the third camera 30 and the monitor 40.

A part of components of the camera monitoring systems 1 to 4 of the above described embodiment may be disposed outside the moving body 61. For example, the image processing device 50 and the like may be realized as a communication device such as a mobile phone or an external server and may be connected wirelessly or wired with other components of the camera monitoring systems 1 to 4.

REFERENCE SIGNS LIST

1, 2, 3, 4 Camera monitoring system
10, 10a First camera
11 First lens
12 First image sensor
13 First communication module
14 First controller
15 First drive unit
20, 20a Second camera
21 Second lens
22 Second image sensor
23 Second communication module
24 Second controller
25 Second drive unit
30 Third camera
31 Third lens
32 Third image sensor
33 Third communication module
34 Third controller
40 Monitor
50 Image processing device
51 Communication module
52 Memory
53 Image processor
60 Network
61 Moving body
62 Driver
63 Dashboard
64 Steering wheel
70 Controller
71 Communication module
72 Processor
80 Switch
101, 102, 103, 104 Range
110 Composite image
111 First captured image
112 Second captured image
113 Third captured image
114 Image from car navigation or image from circumferential monitor camera
121, 122 Protruded portion
131, 132, 133, 134, 135, 136 Gear

The invention claimed is:

1. A camera monitoring system, comprising:
    a first camera configured to capture an image of an area including a predetermined area on the left side of a vehicle;
    a second camera configured to capture an image of an area including a predetermined area on the right side of the vehicle;
    a third camera configured to capture an image of an area including a predetermined area behind the vehicle;
    a monitor configured to display a composite image including a first captured image captured by the first camera, a second captured image captured by the second camera and a third captured image captured by the third camera; and
    an image processor configured to
        control a layout of the composite image, and
        change the layout according to at least environmental information about an external environment of the vehicle.

2. The camera monitoring system according to claim 1, wherein the image processor switches an aspect ratio of the first captured image and the second captured image displayed on the monitor according to at least either moving body information or the environmental information.

3. The camera monitoring system according to claim 2, wherein the image processor switches to a layout in which the first captured image and the second captured image are displayed horizontally long in response to detecting a turn signal switch operation of the vehicle.

4. The camera monitoring system according to claim 2, wherein the image processor switches to a layout in which the first captured image and the second captured image are displayed horizontally long when a speed of the vehicle becomes greater than or equal to a predetermined speed.

5. The camera monitoring system according to claim 2, wherein the image processor switches to a layout in which the first captured image and the second captured image are displayed horizontally long when detecting that the vehicle travels on a road having multiple lanes.

6. The camera monitoring system according to claim 2, wherein the image processor switches to a layout in which the first captured image and the second captured image are displayed vertically long when a gear of the vehicle is set in reverse.

7. The camera monitoring system according to claim 2, further comprising:
　a first drive unit configured to drive rotation of the first camera;
　a second drive unit configured to drive rotation of the second camera; and
　a controller configured to control the first drive unit and the second drive unit, switch an aspect ratio of the first captured image by rotating the first camera, and switch an aspect ratio of the second captured image by rotating the second camera.

8. The camera monitoring system according to claim 2, wherein
　the first camera comprises a first lens, a first image sensor and a first drive unit configured to drive rotation of the first lens and the first image sensor;
　the second camera comprises a second lens, a second image sensor and a second drive unit configured to drive rotation of the second lens and the second image sensor;
　the camera monitoring system further comprises a controller configured to control the first drive unit and the second drive unit, switch an aspect ratio of the first captured image by rotating the first lens and the first image sensor, and switch an aspect ratio of the second captured image by rotating the second lens and the second image sensor.

9. The camera monitoring system according to claim 2, wherein
　the first camera comprises a first image sensor and a first drive unit configured to drive rotation of the first image sensor;
　the second camera comprises a second image sensor and a second drive unit configured to drive rotation of the second image sensor;
　the camera monitoring system further comprises a controller configured to control the first drive unit and the second drive unit, switch an aspect ratio of the first captured image by rotating the first image sensor, and switch an aspect ratio of the second captured image by rotating the second image sensor.

10. The camera monitoring system according to claim 1, wherein the first camera, the second camera and the third camera are devices configured to capture an image of a range that includes a range specified in United Nations Regulations No. 46 on indirect vision.

11. An image processing device, comprising:
　a communication module configured to receive a first captured image captured by a first camera configured to capture an image of an area including a predetermined area on the left side of a vehicle, a second captured image captured by a second camera configured to capture an image of an area including a predetermined area on the right side of the vehicle and a third captured image captured by a third camera configured to capture an image of an area including a predetermined area behind the vehicle; and
　an image processor configured to control a layout of a composite image displayed on a monitor, the composite image including the first captured image, the second captured image and the third captured image, and to change the layout according to at least environmental information about an external environment of the vehicle.

12. A vehicle comprising a camera monitoring system, the camera monitoring system including:
　a first camera configured to capture an image of an area including a predetermined area on the left side of a vehicle;
　a second camera configured to capture an image of an area including a predetermined area on the right side of the vehicle;
　a third camera configured to capture an image of an area including a predetermined area behind the vehicle;
　a monitor configured to display a composite image including a first captured image captured by the first camera, a second captured image captured by the second camera and a third captured image captured by the third camera; and
　an image processor configured to control a layout of the composite image and to change the layout according to at least environmental information about an external environment of the vehicle.

13. An image processing method for a camera monitoring system comprising a first camera, a second camera, a third camera, a monitor and an image processor, the method comprising:
　capturing, by the first camera, an image of an area including a predetermined area on the left side of a vehicle;
　capturing, by the second camera, an image of an area including a predetermined area on the right side of the vehicle;
　capturing, by the third camera, an image of an area including a predetermined area behind the vehicle;
　controlling, by the image processor, a layout of a composite image displayed on the monitor, and changing, by the image processor, the layout according to at least environmental information about an external environment of the vehicle; and
　displaying, by the monitor, the composite image including a first captured image captured by the first camera, a second captured image captured by the second camera and a third captured image captured by the third camera, the layout of the composite image being controlled by the image processor.

14. The camera monitoring system of claim 1, wherein the environmental information includes at least one of,
- brightness,
- weather,
- atmospheric pressure,
- ambient temperature,
- map information,
- traffic information,
- road information,
- road work information,
- a temporary change of a speed limit of a traveling path of the vehicle,
- an object detected by another vehicle, and
- a lighting state of a traffic light.

15. The image processing device of claim 11, wherein the environmental information includes at least one of,
- brightness,
- weather,
- atmospheric pressure,
- ambient temperature,
- map information,
- traffic information,
- road information,
- road work information,
- a temporary change of a speed limit of a traveling path of the vehicle,
- an object detected by another vehicle, and
- a lighting state of a traffic light.

16. The vehicle of claim 12, wherein the environmental information includes at least one of,
- brightness,
- weather,
- atmospheric pressure,
- ambient temperature,
- map information,
- traffic information,
- road information,
- road work information,
- a temporary change of a speed limit of a traveling path of the vehicle,
- an object detected by another vehicle, and
- a lighting state of a traffic light.

17. The image processing method of claim 13, wherein the environmental information includes at least one of,
- brightness,
- weather,
- atmospheric pressure,
- ambient temperature,
- map information,
- traffic information,
- road information,
- road work information,
- a temporary change of a speed limit of a traveling path of the vehicle,
- an object detected by another vehicle, and
- a lighting state of a traffic light.

* * * * *